Aug. 8, 1961 R. F. LONABERGER 2,994,994
GRINDING APPARATUS AND THE LIKE
Filed March 23, 1960 9 Sheets-Sheet 2

FIG. 2.

INVENTOR:
Robert F. Lonaberger,
BY
Alfred E. Ischinger
ATTORNEY.

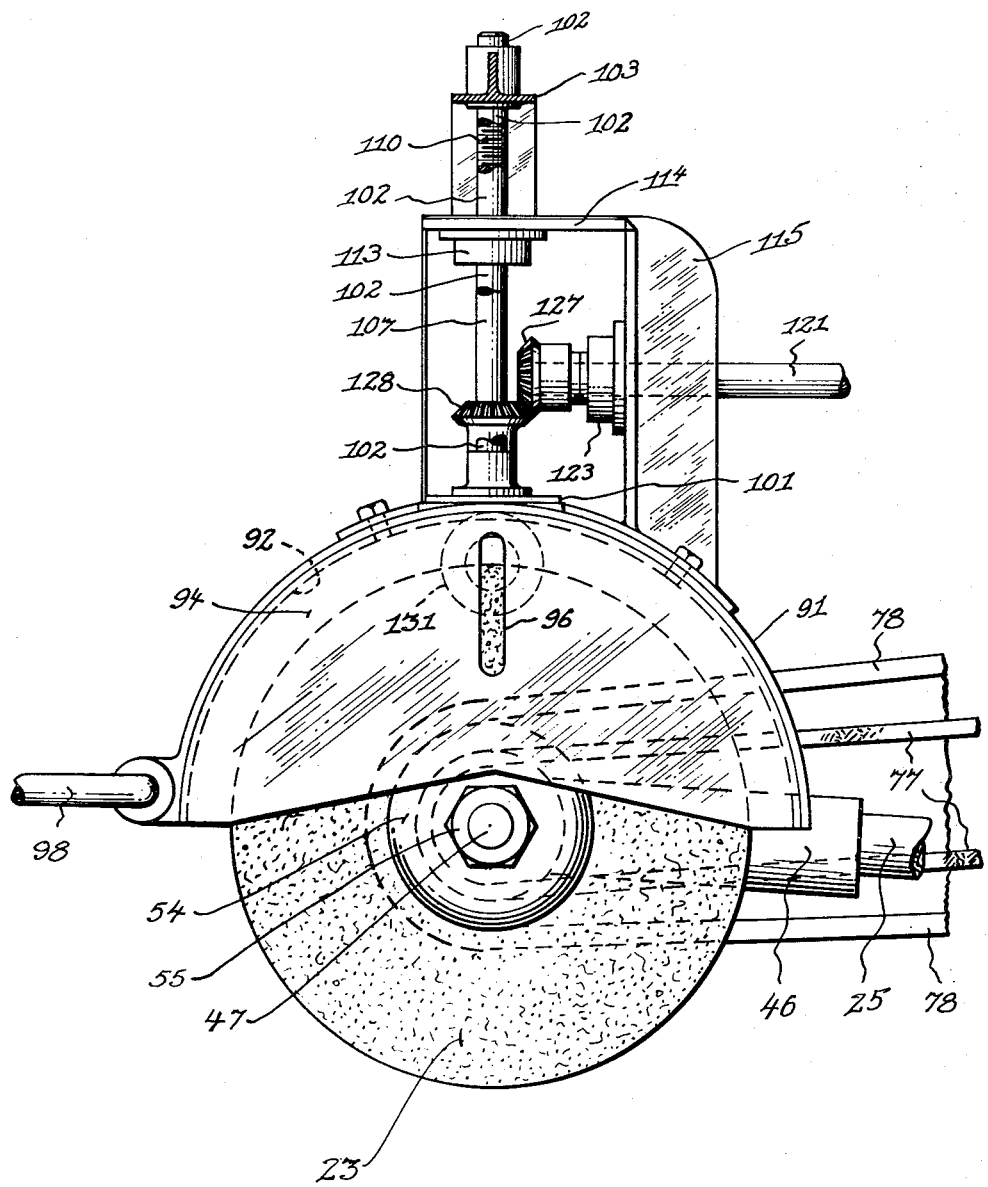

Aug. 8, 1961 R. F. LONABERGER 2,994,994
GRINDING APPARATUS AND THE LIKE
Filed March 23, 1960 9 Sheets-Sheet 5
FIG_5_
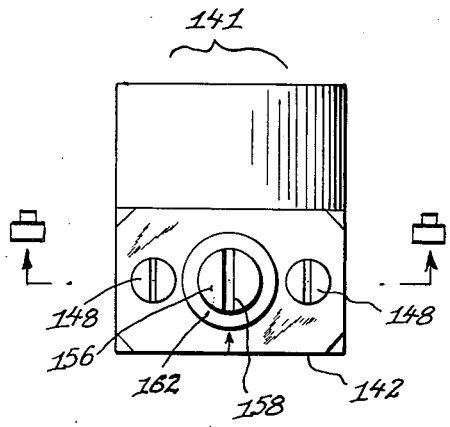
FIG_7_
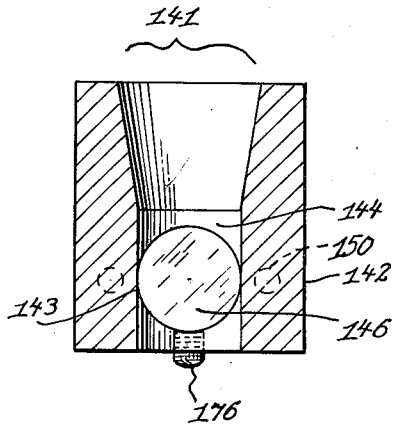
FIG_6_
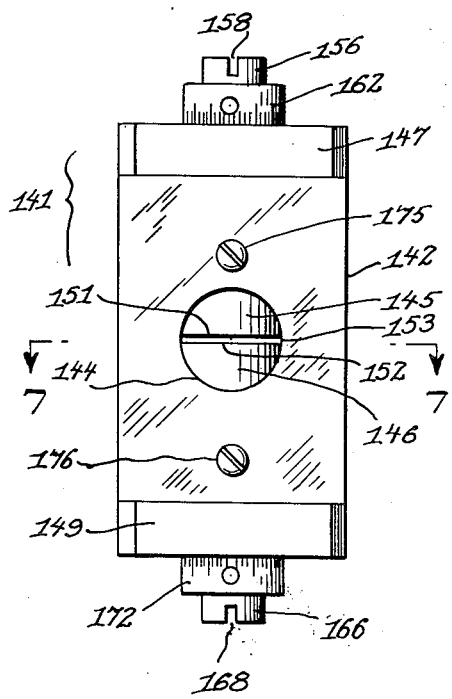
FIG_8_
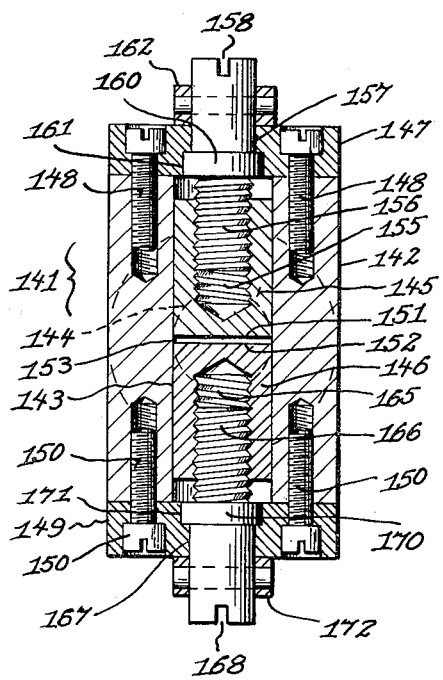
INVENTOR:
Robert F. Lonaberger,
BY
Alfred E. Ischinger
ATTORNEY.

Aug. 8, 1961  R. F. LONABERGER  2,994,994

GRINDING APPARATUS AND THE LIKE

Filed March 23, 1960  9 Sheets-Sheet 6

INVENTOR:
Robert F. Lonaberger,
BY
Alfred E. Ischinger
ATTORNEY.

Aug. 8, 1961 R. F. LONABERGER 2,994,994
GRINDING APPARATUS AND THE LIKE
Filed March 23, 1960 9 Sheets-Sheet 7
FIG-11-
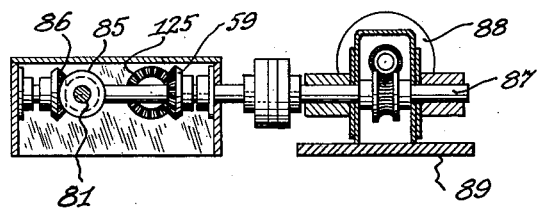
FIG-12-
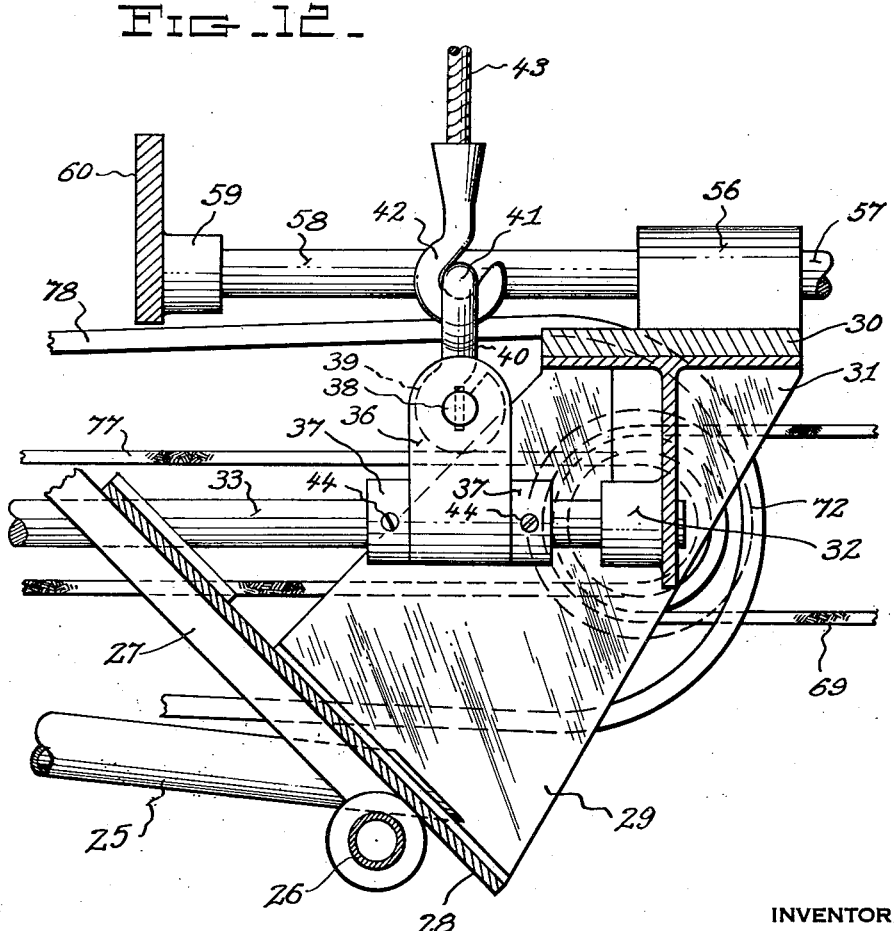
INVENTOR:
Robert F. Lonaberger,
BY
Alfred E. Ischinger
ATTORNEY.

Aug. 8, 1961 R. F. LONABERGER 2,994,994
GRINDING APPARATUS AND THE LIKE
Filed March 23, 1960 9 Sheets-Sheet 8
Fig. 14.     Fig. 13.
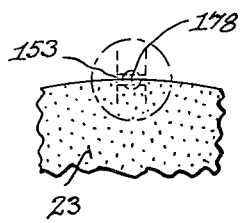
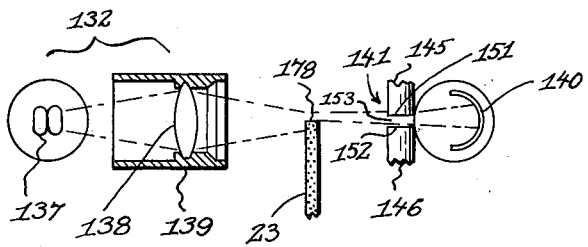
Fig. 16.     Fig. 15.
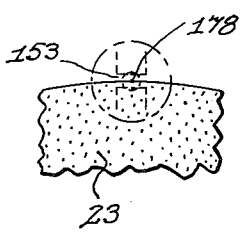
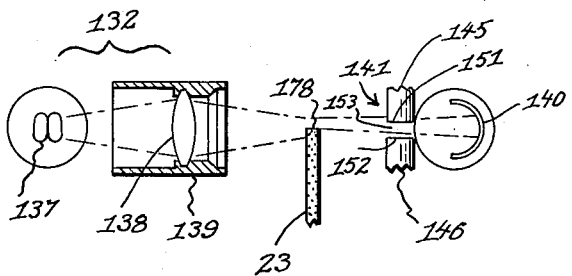
Fig. 18.     Fig. 17.
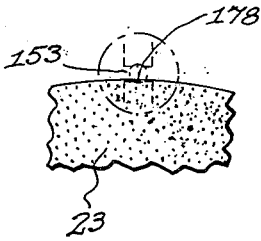
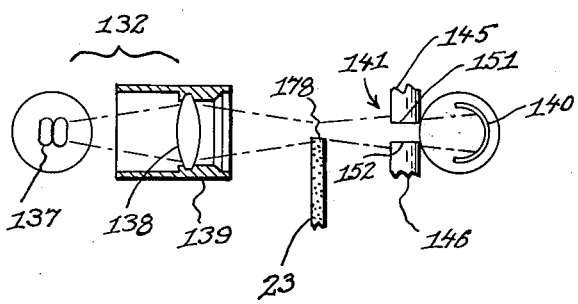
INVENTOR:
Robert F. Lonaberger,
BY
Alfred E. Ischinger
ATTORNEY.

Aug. 8, 1961  R. F. LONABERGER  2,994,994
GRINDING APPARATUS AND THE LIKE
Filed March 23, 1960  9 Sheets-Sheet 9

Fig. 19.

INVENTOR:
Robert F. Lonaberger,
BY
Alfred E. Jschinger
ATTORNEY.

United States Patent Office 2,994,994
Patented Aug. 8, 1961

2,994,994
GRINDING APPARATUS AND THE LIKE
Robert F. Lonaberger, Reading, Pa., assignor to The Scan-O-Matic Company, a corporation of Pennsylvania
Filed Mar. 23, 1960, Ser. No. 17,134
12 Claims. (Cl. 51—134.5)

This invention relates to grinding apparatus and the like, and more particularly concerns apparatus of this type in which a rotary grinding wheel is initially operated at a predetermined peripheral grinding speed, which speed is substantially maintained while the diameter of the grinding wheel is reduced due to work performing wear thereof so as to effect maximum grinding efficiency of the grinding wheel and a substantial increase in the working life thereof.

One object of my invention is to provide a novel and improved grinding apparatus of the type indicated.

Another object of the invention is to provide such an apparatus having certain structural and functional features of advantage over similar devices of the prior art.

A further object of the invention is to provide such an apparatus having a novel photoelectric system that is responsive to certain incremental diameter reductions of the grinding wheel and operates to effect an increase in the velocity of the grinding wheel in compensating relation with said grinding wheel diameter reductions.

It is also an object of the invention to provide such an apparatus comprising, a rotatably mounted grinding wheel, means for rotating said grinding wheel at a velocity establishing a predetermined peripheral grinding speed, means for periodically increasing the velocity of the grinding wheel in compensating relation with certain incremental diameter reductions thereof resulting from work performing use, and a photoelectric system that is responsive to said incremental diameter reductions of the grinding wheel and effects actuation of said velocity increasing means, whereby the said predetermined peripheral grinding speed is substantially maintained during the entire working life of the grinding wheel.

Still another object of the invention is to provide such an apparatus that includes one or more features in combination, such as:

(1) A variable speed drive operable by a constant speed electric motor for rotating the grinding wheel.

(2) A carriage for supporting the constant speed electric motor and operable when certain incremental diameter reductions of the grinding wheel are attained to effect a change in the variable speed drive whereby the velocity of the grinding speed is increased to substantially maintain the predetermined peripheral grinding speed.

(3) A transmission motor and means operated thereby to provide for shifting the position of the motor supporting carriage and thereby effect a change in the operating characteristics of the variable speed drive.

(4) A photoelectric system responsive to certain incremental diameter reductions of the grinding wheel for controlling the positioning of the transmission motor.

(5) A phototube for the photoelectric system mounted in a holder positioned adjacent to the grinding wheel and arranged to energize a photoelectric relay when certain incremental diameter reductions of the grinding wheel occur.

(6) A mechanism operatively connected to the transmission motor for simultaneously lowering the phototube holder when the carriage of the drive motor is shifted, so that the phototube is positioned for activation when a predetermined reduction of the diameter of the grinding wheel is attained.

(7) A mechanism for controlling the size of the operating beam of light for the phototube.

(8) A photoelectric relay arrangement which comprises a thyratron tube and control means therefor whereby the tube must reach a predetermined operating temperature before it functions to effect an electric current flow.

(9) A photoelectric system which includes a phototube, a thyratron tube and a drive motor that are connected to a source of electric current through a time delay circuit arrangement including a pair of amperite tubes, so that when the circuit is initially closed the light source for the phototube is energized so that light will be shining on the phototube uninterruptedly for at least one-half minute to allow the thyratron tube to reach the temperature at which it will cause operation of the drive motor.

With these and other objects in view, which will become readily apparent from the following detailed description of the various unique, practical and illustrative improvements shown in the accompanying drawings, the present invention comprises the novel elements, features of construction and arrangement of parts in cooperative relationship, as more particularly indicated and defined by the hereto appended claims.

In the accompanying drawings:

FIG. 2 is a side elevation of the structure shown in FIG. 1;

FIG. 4 is a vertical section taken substantially along the line 4—4 of FIG. 3;

FIG. 5 is an enlarged plan view of a slot unit device which forms part of my invention and is adapted to be arranged in front of the photoelectric device shown in FIG. 3;

FIG. 6 is a front elevation of the device shown in FIG. 5;

FIG. 7 is a horizontal section taken substantially along the line 7—7 of FIG. 6;

FIG. 8 is a vertical section taken substantially along the line 8—8 of FIG. 5;

FIG. 11 is a vertical transverse section taken substantially along the line 11—11 of FIG. 1;

FIG. 12 is a detail vertical section taken substantially along the line 12—12 of FIG. 1, parts being omitted to clearly show the underlying structure;

FIG. 13 is a diagrammatic view of the photoelectric elements which are arranged with the grinding wheel, showing the initial gap size when a new or unused grinding wheel of predetermined diameter is installed in operative position on the grinding apparatus;

FIG. 14 is a view of a portion of the grinding wheel of FIG. 13, showing parts of the photoelectric elements by broken lines;

FIG. 15 is a diagrammatic view similar to FIG. 13, showing the proper gap size before the grinding apparatus is started in operation;

FIG. 16 is a view similar to FIG. 14, showing the arrangement of the parts of FIG. 15;

FIG. 17 is a diagrammatic view similar to FIGS. 13 and 15, showing the gap size when the photoelectric elements function in a resetting maner;

FIG. 18 is a view similar to FIGS. 14 and 16 showing the arrangement of the parts of FIG. 17; and FIG. 19 is a wiring diagram of the electric power system of the grinding apparatus and the photoelectric system therefor.

Figure 1:
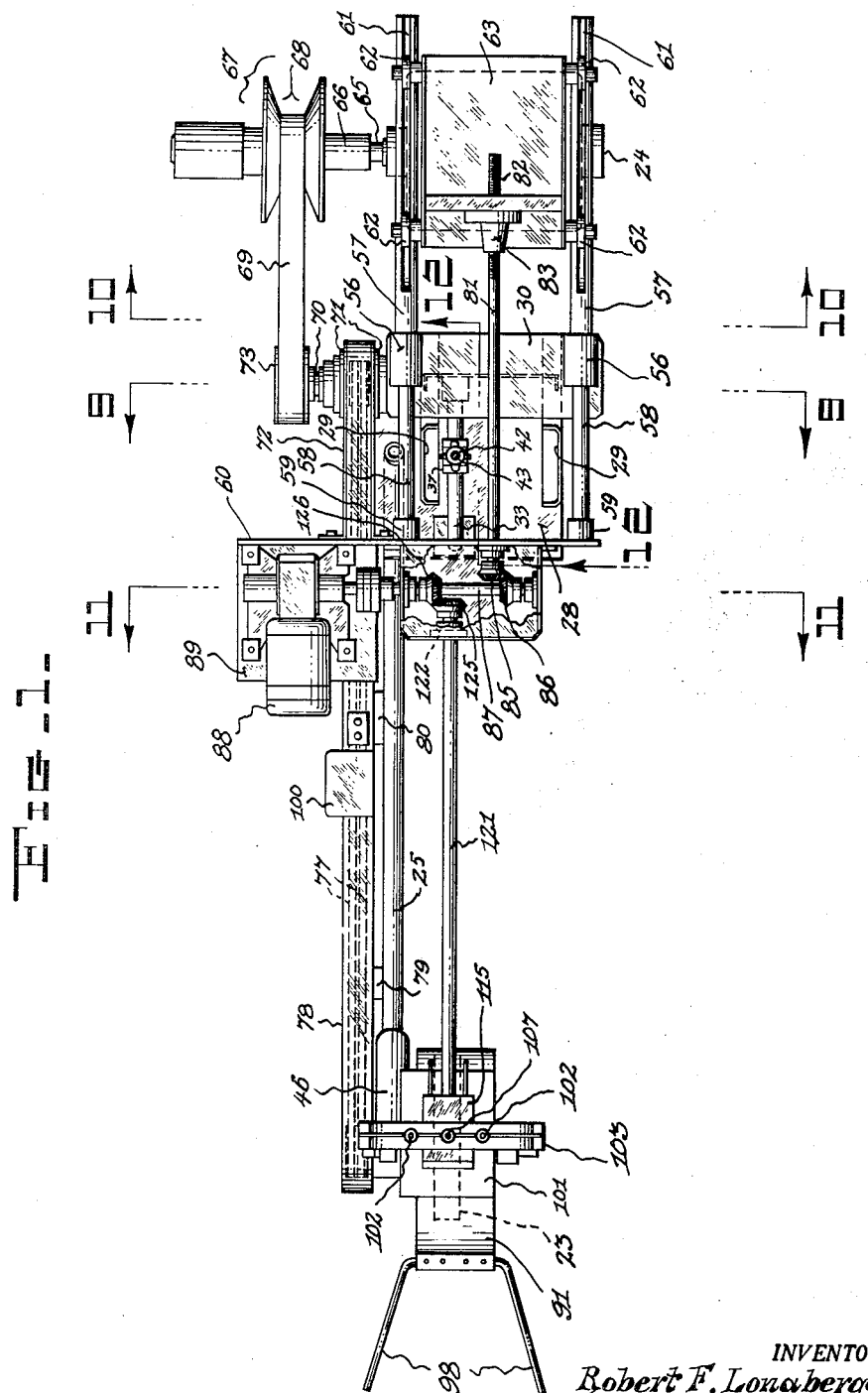
FIG. 1 is a top plan view of one form of grinding apparatus having a photoelectric system for automatically controlling the peripheral speed or velocity of its grinding wheel in accordance with my invention.

Referring to the drawings, the new and improved grinding apparatus of the present invention is preferably of the swing frame type having a grinding wheel 23 at its front end, and an electric motor 24 at its rear end for operating the grinding wheel 23.

The grinding apparatus comprises an elongated main frame member 25, to which sub-frame members of various shapes and sizes are united to provide a unitary rigid structure of great strength for supporting the several units comprising the grinding apparatus in the manner to be hereinafter more fully described.

The main frame member 25 is preferably formed of a suitable length of tubular rod or pipe having mounted on the underside thereof at its rear end, a rod 26 which is arranged substantially at right angles to the rod 25 and projects laterally therefrom to provide a support for a bracket 27.

The bracket 27 extends upwardly at a suitable angle from the rod 26 in a direction toward the front end of the main frame member 25 and provides a support for a plate 28.

Arranged in suitable spaced apart relationship and extending upwardly and rearwardly from the plate 28, are the legs 29 of a bracket 30.

Depending from the bracket 30, and arranged between the legs 29 thereof, is a hanger 31 which is provided with a tubular boss 32 for the rear end portion of a shaft 33.

The shaft 33 is arranged lengthwise of the grinding apparatus and has its front end mounted in the tubular boss 34 of a bracket 35 fixedly mounted on the main frame member 25 at a suitable distance forwardly from the rod 26.

A U-shaped yoke 36, slidably mounted on the shaft 33 and held from sliding movements thereon by a pair of collars 37 arranged at opposite sides of said yoke, is provided with a pin 38 for the lower eye 39 of a double-eyed link 40. The upper eye 41 of the link 40 is arranged to receive a hook 42 on the lower end of a cable 43, by means of which the grinding apparatus is suspended from a suitable overhead support (not shown).

By securing the suspension cable 43 with the yoke 36 in the manner above described, the grinding apparatus can be initially balanced by separating the collars 37 from the yoke and thereafter shifting the position of the yoke lengthwise of the shaft 33 until the desired balanced condition is obtained. After which the collars 37 are assembled against the opposite sides of the yoke 36 and fixed in position on the shaft 33 by means of set screws 44 in the manner shown in FIG. 12.

By suspending the balanced grinding apparatus from a cable, as above described, the grinding apparatus is freely movable into numerous operating positions and at various angles in relation to the material to be worked.

A bracket 46, fixedly secured to the front end of the main frame member 25, provides a support for a rotatable spindle 47.

Figure 3:
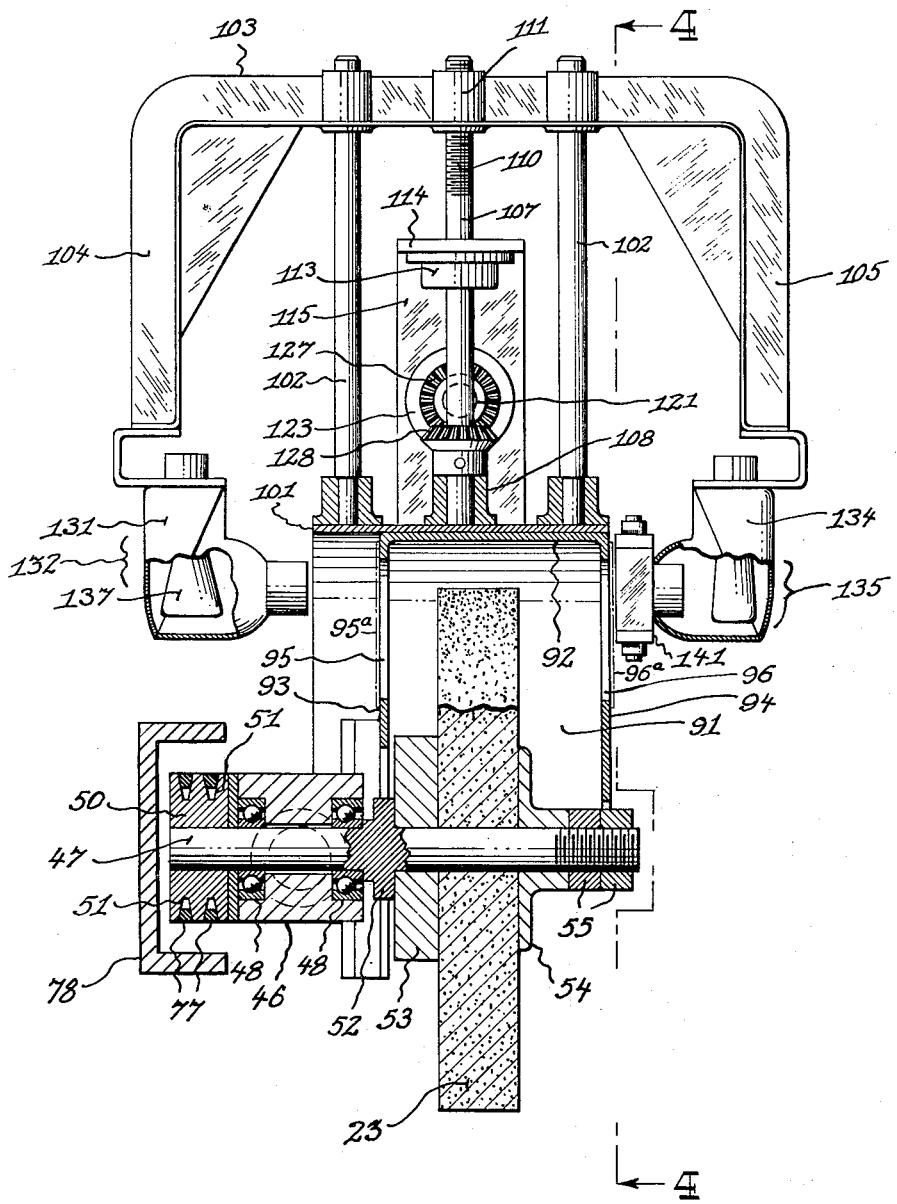
FIG. 3 is a vertical transverse section taken substantially along the line 3—3 of FIG. 2.

The spindle 47 is journalled in spaced ball bearings 48 mounted in the bracket 46 in the manner shown in FIG. 3, so that one end of the spindle extends outwardly from one side of said bracket and the other end of said spindle extends outwardly from the opposite side of the bracket 46.

A pulley 50, fixedly mounted on one end portion of the spindle 47, is formed with axially spaced annular belt grooves 51.

The intermediate portion of the spindle 47 is formed with a flange 52 which provides a shoulder for an annular spacer disk 53.

The grinding wheel 23 is mounted on the spindle 47 and clamped between the disk 53 and another spacer disk 54 which is held flush against the outer face of the grinding wheel 23 by nuts 55 on the outer threaded end of the spindle. The manner in which the grinding wheel 23 is mounted on the spindle 47 follows the well known prior art practice in this field.

The upper face of the bracket 30 has a pair of spaced bosses 56 formed thereon, in each of which bosses is mounted the intermediate portion of a round rod or bar 57.

As shown in FIG. 1, the two rods or bars 57 are arranged in parallel spaced relationship and one portion of said rods extends rearwardly from the bracket 30 for a suitable distance. The other portions 58 of the rods or bars 57 extend forwardly from the bosses 56 and are mounted in bosses 59 of a vertically arranged plate constituting a bracket 60.

The upper or top portion of each rod or bar 57 is formed with a groove or slot 61 which is arranged lengthwise thereof to receive therein wheels 62 of a carriage 63.

Figure 10:
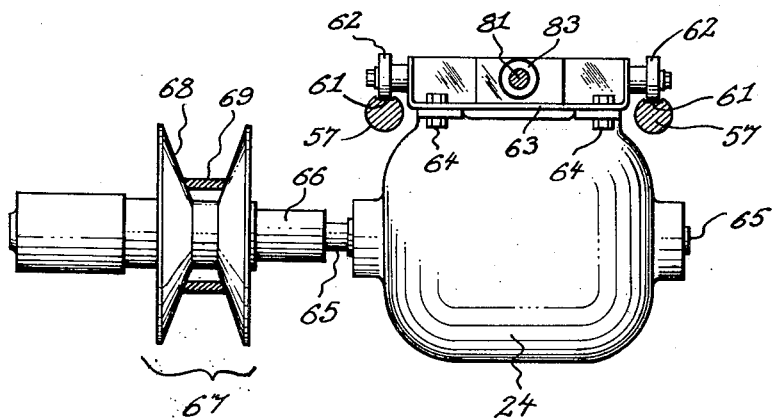
FIG. 10 is a vertical transverse section taken substantially along the line 10—10 of FIG. 1.

As shown in FIG. 10, the construction and arrangement of the parts is such that the carriage 63 is arranged between the spaced parallel rods or bars 57, the wheels 62 at each side thereof riding in the tracks provided by the grooves 61 so that the carriage 63 is movable lengthwise of the apparatus in directions toward and away from the grinding wheel 23.

The electric motor 24, which is of the constant speed type, is bolted or otherwise fastened to the underside of the carriage 63, as indicated at 64, and said motor is arranged under said carriage with its drive shaft 65 projecting laterally from one side of the carriage 63, in the manner shown in FIG. 1.

As illustrated in FIGURE 1, on the outer end of the motor drive shaft 65, is mounted the hub 66 of a variable speed pulley 67. The variable speed pulley 67 illustrated is of a standard commerical variety such as manufactured by the Lovejoy Flexible Coupling Company, said pulley having a pair of sheaves movable toward and away from each other to provide a V-shaped groove 68 for an endless wide V-belt 69. As the groove 68 between the sides of the pulley 67 in which the wide V-belt 69 operates is made wider, the belt 69 drops deeper into the groove, thereby decreasing the sheave diameter or pitch of the pulley in the manner shown in FIG. 1. Conversely, narrowing the groove 68 moves the belt 69 out and increases the effective diameter or pitch of the pulley 67 for the purpose to be hereinafter more fully described.

Figure 9:
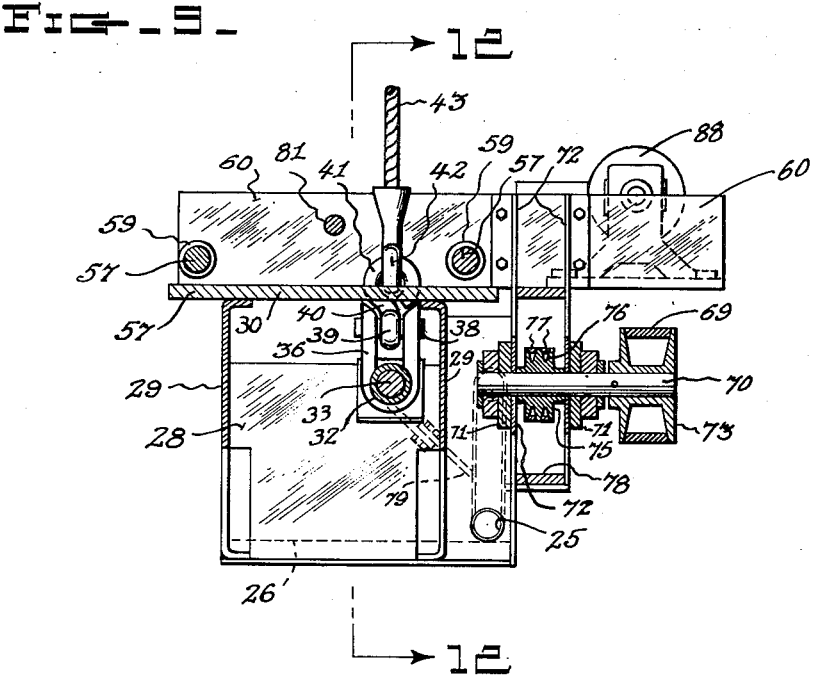
FIG. 9 is a vertical transverse section taken substantially along the line 9—9 of FIG. 1.

A jack shaft 70 is rotatably supported by bearings 71 carried by a bracket 72 on the frame plate 60, in the manner shown in FIG. 9 and is provided with a pulley or sheave 73 having an annular V-shaped belt groove. The wide V-belt 69 passes around the pulleys 67 and 73 and imparts rotation to the jack shaft 70 from the motor drive shaft 65.

A second pulley or sheave 75, fixedly mounted on the jack shaft 70, is formed with axially spaced annular V-shaped belt grooves 76.

A pair of endless V-belts 77 pass around the pulleys 50 and 75 and provide a driving connection by which the grinding wheel 23 is operated by power derived from the electric motor 24.

As a safety measure, the belts 77 may be enclosed by a guard housing 78, which is supported from the main frame member 25 by brackets 79 and 80, arranged in the manner shown in FIGS. 1 and 2.

It will be noted that by this arrangement, while the motor drive shaft 65 operates at a constant number of revolutions per minute, the number of revolutions per minute of the grinding wheel spindle 47 and the jack shaft 70 will be varied so that as the diameter of the grinding wheel 23 is reduced due to work performing wear thereof, the peripheral speed or velocity of the grinding wheel 23 will be maintained substantially at the predetermined grinding speed at which a new grinding wheel of predetermined diameter operates when initially installed on the spindle 47.

With the grinding wheel 23 at its predetermined maximum diameter, as shown in FIG. 2, the shaft 65 of the electric motor 24 is disposed a distance from the jack shaft 70 by which the drive belt 69 is disposed near the bottom of the groove 68 of the pulley 67, in the manner shown in FIG. 10. In this position the sheave or pitch diameter of the pulley 67 is such that the driven belts 77 operate at a speed by which the grinding wheel 23 is rotated at the predetermined number of revolutions per minute to attain the desired peripheral speed or velocity.

The peripheral speed or velocity of the grinding wheel 23 may be substantially maintained as the diameter of the grinding wheel is reduced due to work performing wear thereof, by adjusting the speed rotation of the jack shaft 70. This adjustment of speed rotation of the jack shaft 70 is obtained by shifting the position of the electric motor carriage 63 on the tracks provided by the two grooved rods or bars 57, to thereby move the electric motor 24 and its drive shaft 65 closer to the jack shaft 70, between the motor positions A and B indicated in FIG. 2, which action automatically effects a change in the pitch diameter of the variable speed pulley 67.

Arranged lengthwise of the grinding apparatus and disposed between the rods or bars 57, is a rod 81 having a screw threaded portion 82 which extends into a threaded nut 83 mounted on one end of the motor carriage 63.

The end of the rod 81 opposite to the screw threaded portion 82, is provided with a bevel gear 85, the teeth of which are in meshing relationship with the teeth of a bevel gear 86 on the shaft 87 of a transmission motor arrangement or device 88 carried by a bracket 89 secured to the frame member 60.

The transmission motor arrangement 88 illustrated includes a standard commercial variety motor identified as Master Right Angle Combination Induction Gearmotor, 220 volt, 60 cycles, one-half horsepower, 3-phase, 1750 r.p.m., repulsion start, output speed 58 r.p.m., ratio 30 to 1, which motor has an adjustable magnetic brake cooperatively combined therewith.

It will be noted that rotation of the shaft 87 of the transmission motor device 88 is transmitted by the gears 86, 85 to the rod 81, which is turned in the nut 83, and in this manner moves the carriage 63 and the electric motor 24 thereon in a direction lengthwise of the main frame 25 of the apparatus.

As shown in FIG. 3, connected to the bracket 46 and partly enclosing the upper portion of the grinding wheel 23, is a hood 91, which is substantially of inverted U-shape in cross section, said hood having an outer semi-circular or arcuate wall 92 and flat side walls 93 and 94.

The hood 91 is of such size that the walls 92, 93 and 94 are arranged in suitable spaced relationship with respect to the grinding wheel 23, so as to provide means for preventing particles of metal and other material from flying toward an operator during operation of the machine.

The side wall 93 has an elongated slot 95 formed vertically therein, and the side wall 94 is provided with a similar elongated vertical slot 96.

As shown in FIG. 4, the slots 95 and 96 are arranged at opposite sides of the grinding wheel 23 in alinement with each other, and disposed perpendicular to the axis of rotation of said grinding wheel. The slots 95 and 96 should have a length extending from a point above the top of an unused grinding wheel to a point near the hub thereof, to thereby expose the side surfaces of the grinding wheel when sighted in a direction crosswise of the hood 91 in the manner to be hereinafter more fully described.

Secured to the lower front portion of the hood 91 and extending forwardly therefrom are handle bars 98, by means of which an operator is enabled to swing the grinding apparatus about the support provided by the cable 43.

A photoelectric system that is responsive to certain incremental diameter reductions of the grinding wheel 23 is provided for controlling the actuation of the velocity increasing means of the apparatus heretofore described, whereby a predetermined peripheral grinding speed is substantially maintained during the entire working life of the grinding wheel 23.

The photoelectric system comprises a photoelectric relay 100 which is shown in FIGS. 1 and 2 mounted on the guard 78. It will be understood that the photoelectric relay 100 may be otherwise arranged with the apparatus to suit desired operating conditions. In addition to the photoelectric relay 100, the photoelectric system of the present invention includes the several elements to be hereinafter described.

The photoelectric relay 100 illustrated is of a standard commercial variety such as manufactured by the General Electric Company under number CR7505-K100G3, said photoelectric relay being a light sensitive electronic control relay, designed to close and open electric circuits upon the interruption or the application of a beam of light. Further information concerning the construction and operation of the relay 100 may be had by referring to the literature relative to the same which is made available to the public by the General Electric Company.

On the hood 91 is a bracket 101 for a pair of standards 102 upon which is slidably mounted a carrier frame 103 of inverted U-shape, having a pair of depending legs 104 and 105 arranged at suitably spaced relationship outwardly with respect to said standards in the manner shown in FIG. 3.

In the space between the standards 102, there is an upwardly extending shaft 107, having its lower end journalled in a bearing 108 on the bracket 101.

The shaft 107 has its upper portion formed with screw threads 110 for engagement with the threaded bore of a boss 111 formed on the carrier frame 103.

The intermediate portion of the shaft 107 is journalled in a bearing 113 in the leg 114 of a bearing bracket 115 on the hood 91.

The construction and arrangement of the parts is such that the upper end portion of the shaft 107 has a threaded connection 110 with the carrier frame 103 at a point located a considerable distance above the bearing 113, so that rectilinear movements for predetermined distances can be imparted to the carrier frame 103 when the shaft 107 is rotated to turn the threaded portion 110 thereof in the nut provided by the threaded bore of the boss 111.

Arranged lengthwise of the main frame 25 of the apparatus is a shaft 121, which is journalled in bearings 122 and 123.

One end of the shaft 121 has a bevel gear 125 mounted thereon, the teeth of which are in meshing relationship with the teeth of a bevel gear 126 mounted on the shaft 87 of the transmission motor device 88 heretofore referred to.

The other end of the shaft 121 has a bevel gear 127 mounted thereon, the teeth of which are in meshing relationship with the teeth of a bevel gear 128 mounted on the shaft 107, in the manner shown in FIGS. 3 and 4.

Operation of the shaft 87 by the transmission motor device 88 is transmitted by the gears 126, 125 to the shaft 121, and from thence by the gears 127 and 128 to the shaft 107, to thereby effect sliding movement of the carrier frame 103 on the standards 102 in either direction for the purpose to be hereinafter more fully described.

Carried by the leg 104 of the carrier frame 103, is a holder 131 for a light source unit 132, and carried by the leg 105 of said carrier frame, is a holder 134 for a phototube unit 135. The units 132 and 135 form part of the standard relay 100.

The light source unit 132 and the phototube unit 135 are parts of the photoelectric relay 100 heretofore referred to and are operatively connected to said photoelectric relay in the manner to be hereinafter more fully described.

The light source unit 132 is arranged at one side of the hood 91 so that the beam of light emanating therefrom will be directed toward the slots 95 and 96 in the side walls 93 and 94 respectively, and will be received by the phototube unit 135 at the opposite side of said hood.

As shown in FIGS. 13, 15 and 17, the light source unit 132 comprises a source of light in the form of an incandescent lamp 137, and a lens 138 mounted in a holder 139 for converging the beam of light from the lamp 137.

The phototube unit 135 comprises a phototube or photocell having an anode 136 (see FIG. 19) and a cathode 140 for receiving the beam of light from the lamp 137. Also forming part of the phototube unit 135 is a mask or slot unit device 141 arranged in front of the phototube to provide a slit aperture of predetermined area through which the light beam from the lamp 137 passes toward the cathode 140 of the phototube.

As shown in FIGS. 5, 6, 7 and 8, a special mask or slot unit device 141 is provided which comprises a body 142 formed with a vertical bore 143 which is intersected at a point midway the length of the body by a horizontal bore 144.

The vertical bore 143 is of uniform diameter throughout its length to provide a cylindrical cavity in which is mountd a pair of blocks 145 and 146.

The upper end of the bore 143 is closed by a cap plate 147 which is detachably secured to the body 142 by screws 148. In a similar manner the lower end of the bore 143 is closed by a cap plate 149 which is detachably secured to the body 142 by screws 150.

The blocks 145 and 146 have a combined length less than the length of the bore 143, so that said blocks can be moved lengthwise of the bore 143 toward and away from each other to provide a space or gap therebetween of a variable amount.

Normally the blocks 145 and 146 are adapted to be positioned within the cavity provided by the bore 143 with the lower face 151 of the block 145 separated from the upper face 152 of the block 146 so that a gap or slot 153 is formed between the adjacent ends of the blocks at a point where the center of the horizontal bore 144 intersects the vertical bore 143.

As shown in FIG. 8, a screw threaded bore 155 is formed along the vertical axis of the block 145, said threaded bore 155 extending downwardly a suitable distance from the upper end of said block and having mounted therein the threaded shank of a micrometer screw 156.

An upper plain shank portion of screw 156 is mounted in a bore 157 of the cap plate 147 and has its upper portion extending a suitable distance above the cap plate 147 and provided with a kerf or slot 158 for the reception of a screw driver or other suitable tool by means of which the screw 156 is adapted to be rotated.

In order to permit rotation of the screw 156 relative to the cap plate 147 and at the same time prevent axial movement of said screw with respect to said cap plate, a collar 160, formed on the shank of said screw, is mounted within a cavity 161 formed on the underside of the cap plate 147, and a second collar 162 is fixedly mounted on the upper exposed portion of said screw and bears against the upper surface of the cap plate 147.

As shown in FIG. 8, a screw threaded bore 165 is formed along the vertical axis of the block 146, said threaded bore 165 extending upwardly a suitable distance from the bottom end of said block and having mounted therein the threaded shank of a micrometer screw 166.

A lower plain shank portion of screw 166 is mounted in a bore 167 of the cap plate 149 and has its lower portion extending a suitable distance below the cap plate 149 and provided with a kerf or slot 168 for the reception of a screw driver or other suitable tool by means of which the screw 166 is adapted to be rotated.

In order to permit rotation of the screw 166 relative to the cap plate 149 and at the same time prevent axial movement of said screw with respect to said cap plate, a collar 170, formed on the shank of said screw, is mounted within a cavity 171 formed on the underside of the cap plate 149, and a second collar 172 is fixedly mounted on the lower exposed portion of said screw and bears against the lower face of the cap plate 149.

It will be noted that the construction and arrangement of the parts of the slot unit device 141 is such that a slit aperture 153 of suitable area can be provided in the body 142 and that the location of said slit aperture 153 with respect to the point of intersection of the center of the horizontal bore 144 with the vertical bore 143 can be accurately positioned by shifting the positions of the blocks 145 and 146 by means of the screws 156 and 166 respectively. Then, after the blocks 145 and 146 have been set in the position to provide the desired slit aperture 153, the blocks 145 and 146 can be locked in adjusted position by means of the set screws 175 and 176, FIG. 6.

Referring now to FIGS. 13 to 18 inclusive, when a new or unused grinding wheel 23 of predetermined diameter is mounted on the apparatus, the carrier frame 103 should be positioned so that the beam of light emanating from the light source or lamp 137 is directed by the lens 138 toward the top of the periphery of the grinding wheel. Preferably the center of the light beam should coincide substantially with the peripheral edge 178 of the grinding wheel 23 as illustrated in FIGS. 13 and 14. Since the holder 134 of the phototube unit 135 is carried by the carrier frame 103 in fixed relationship with the holder 131 of the light source unit 132, the phototube 135 and its slot unit device 141 will be arranged substantially in axial alinement with the center of the light beam from the lamp 137. The slit aperture of the slot unit device 141 should be initially set so that the lower face 151 of the block 145 is separated from the upper face 152 of the block 146 a distance of approximately .375 of an inch. In actual practice it has been found that when the gap 153 of the slot unit device 141 is .375 of an inch in height and said slot unit is centered with the peripheral edge 178 of the grinding wheel 23 in the manner illustrated in FIG. 13, the upper portion of the grinding wheel will intercept or block off a portion of the light beam, so that an insufficient amount of light energy necessary to energize the phototube will pass through the slot 153 and impinge on the cathode 140. This preliminary setting of the gap 153 of the slot unit device 141 is not useful for actual operation of the apparatus, but it is desirable in order to determine the proper size of slit aperture required to produce a beam of light from the lamp 137 of sufficient intensity to energize the cathode 140 of the phototube. Therefore, in order to provide a light beam of desired intensity, the area of the gap 153 should be increased. In actual practice it has been found that when the gap 153 is approximately .431 of an inch in height, as illustrated in FIGS. 15 and 16, the intensity of the light beam will be blocked off an amount sufficient to delay energization of the cathode 140 until the diameter of the grinding wheel 23 decreases an amount by which the light beam is unblocked, as illustrated in FIGS. 17 and 18. In this way, when the diameter of the grinding wheel 23 decreases a predetermined amount, enough light is permitted to strike the cathode 140 to energize said cathode and thereby effect operation of the photoelectric system in the manner to be hereinafter more fully described.

Referring now to FIG. 19, the apparatus of the present invention is designed to be operated by 220 volt electric current from a suitable source, supplied by main line conductors L1, L2 and L3.

A master switch device 181 is electrically connected to the conductors L1, L2 and L3 for controlling the flow of current to the several circuits.

The master switch device 181 comprises a push button start switch 182, a push button stop switch 183, and an overload reset switch 184.

The drive motor 24 is directly connected by conductors 185, 186 and 187 to the master switch device 181 so that when the push button start switch 182 is operated to close the circuit, said motor will be supplied with 220 volt current and immediately activated. In this way the grinding wheel 23 is rotated by the driving connection from the motor 24 provided by the belt 69, jack shaft 70 and belts 77 in the manner heretofore described.

Conductors 189, 190 and 191 lead from the drive motor conductors 185, 186 and 187, respectively, and are connected to a magnetic breaker device 192. This magnetic breaker 192 is connected to a reversing switch device 193 by conductors 194, 195 and 196, and the reversing switch device is connected to the transmission motor 88 by conductors 197, 198 and 199. Normally the transmission motor circuit is de-energized due to the fact that the magnetic breaker 192 is open, said transmission motor being adapted to be energized during operation of the apparatus in the manner to be hereinafter described.

Connected to the conductors 190 and 191 by conductors 201 and 202, respectively, is the 220 volt primary of a transformer 203, having its 110 volt secondary connected by conductors 205 and 206 to the primary of a transformer 208 of the light source unit 132.

From the secondary of the transformer 208 current of 5.25 volts is supplied to the incandescent lamp 137, so that said lamp is energized at the same time power is applied to the electronic circuit.

Leading from the primary of the transformer 208, are conductors 210 and 211, which are connected to the primary 212 of the photoelectric relay transformer 214.

A pilot lamp 215 is provided for the purpose of indicating energization of the circuit of the light source unit 132, as well as energization of the circuit electrically connecting the transformer 203 with the photoelectric relay 100. This pilot lamp 215 is mounted on a suitable part of the grinding apparatus where it is readily observable by an operator, and said lamp is electrically connected with the conductors 210 and 211 in the manner shown in FIG. 19.

The secondary 216 of the photoelectric relay transformer 214 is connected by conductors 218 and 219 to a thyratron 220, which is adapted to reach a predetermined operating temperature before it is called upon to pass current, The thyratron 220 is connected to the two terminals 221 and 222 of the relay 223 of the photoelectric relay unit 100, by conductors 224 and 225, respectively, said relay 223 having points 227 and 228, which function in the manner to be described.

The anode 136 of the phototube is connected to the thyratron 220 by a conductor 230. The cathode 140 of the phototube is also connected to the thyratron 220, by a conductor 231, rheostat 232, and conductors 233 and 219.

The rheostat 232, which is connected to the secondary 216 of the transformer 214, is arranged to control proper functioning of the electronic circuit, and for this purpose said rheostat is provided with an adjustment knob to which the conductor 231 is connected.

When the illumination of the phototube 135 is well in excess of the minimum required, the photoelectric relay will respond to a complete light cutoff regardless of the setting of the adjustment knob of the rheostat 232. In such case, it is the practice to leave the knob turned completely counterclockwise. With this adjustment, the light source may become less intense and still will be satisfactory for the operation of the relay. If, however, some stray light cannot be avoided, the knob is adapted to be turned clockwise so as to cause the electric circuit to respond to a higher light level.

It will be noted that the phototube 135 is arranged to control the thyratron 220, which in turn is adapted to energize or de-energize the relay 223. The points 227 and 228 of the relay 223 remain open until such time that sufficient light strikes the cathode 140 of the phototube. When this light is increased a predetermined amount resulting from a reduction in the diameter of the grinding wheel 23 and the unblocking of the aperture 153, the thyratron 220 will pass current, thus energizing the coils of the relay 223, and thereby closing the relay points 227 and 228.

The relay 223 is connected to the primary 212 of the transformer 214 by a closed circuit, generally indicated at 234, and comprising a pair of amperite tubes 235 and 236, which function as a time delay relay.

The amperite tubes are of different values. The amperite tube 235 is adapted to be heated for a period of at least one-half minute when the start switch 182 is operated to energize the transformer 214, before it is called upon to pass current to the relay 223, and this amperite tube 235 is usually termed a 45 second tube, while the amperite tube 236 requires a less period of heating time and is usually termed a 2 second tube.

As illustrated the amperite tube 236 has a contact point 237 which is normally engaged by a contact arm 238 arranged between the contact point 237 and a contact point 239 of the amperite tube 235.

When the relay 223 is de-energized, the contact arm 238 is disconnected from the contact point 239.

The contact point 237 of the amperite tube 236 is connected to one terminal of the magnetic breaker 192, by a conductor 240.

*Operation*

From the foregoing description of the various parts of my apparatus and the manner in which they perform their intended functions, it will be apparent that the operation of the apparatus is, in general, substantially as follows:

Assuming that a new unused grinding wheel 23 has been installed for use by the apparatus and assuming further that the various parts of the apparatus are arranged for functioning substantially as shown in the drawings.

As the periphery 178 of the grinding wheel 23 wears away from performing work, as shown in FIGS. 15 and 17, the slit aperture 153 is unblocked an amount sufficient to increase the intensity of the beam of light from the lamp 137 impinging on the cathode 140, so that said cathode is energized. When the cathode 140 is energized it energizes the thyratron 220. The thyratron 220 then passes current which energizes the coils of the relay 223, thereby closing the points 227 and 228. When the points 227 and 228 are closed, current flows through the circuit 234, thereby causing the arm 238 to move into contact with the point 239 of the amperite tube 235 and close the circuit to the magnetic breaker 192. When the circuit of the magnetic breaker 192 is closed, power is supplied from the conductors 189, 190 and 191 to the transmission motor 88, through conductors 194, 195 and 196, the reversing unit 193, and conductors 197, 198 and 199, thereby energizing said transmission motor. Operation of the transmission motor 88 imparts rotation to the rod 81 and the shaft 121, thereby simultaneously shifting the positions of the motor carriage 63 and the carrier frame 103 in the manner heretofore described, so that the motor 24 is moved closer to the jack shaft 70 and the light source unit 132 and the phototube unit 135 are lowered. Downward movements of the light source unit 132 and the phototube unit 135 return these units to a position in which the periphery 178 of the grinding wheel 23 intercepts the beam of light from the lamp 137, thereby cutting off the intensity of the light and de-energizing the cathode 140. As the result the thyratron 220 is de-energized and ceases to pass current so that the points of the relay 223 open, thereby breaking the circuit through which the magnetic breaker 192 is activated to pass current to the transmission motor 88. In this manner the operation of the transmission motor 88 ceases until another reduction of the diameter of the grinding wheel 23 occurs, when the operation described above will be repeated.

When the grinding wheel 23 is worn away, as the result of work performing wear, to such a small diameter that its working life comes to an end, the reversing unit 193 is operated to reverse the direction of operation of the transmission motor 88 and thereby return the motor carriage 63 and the carrier frame 103 to their initial positions illustrated in the drawings. The worn grinding wheel is then replaced with a new unused grinding wheel, and the parts are then adjusted to set the light unit 132 and the phototube 135 in operative position with the peripheral edge 178 of the grinding wheel in the manner heretofore described.

*Modifications*

It will be understood by those skilled in this art that the improvements specifically shown and described can be changed and modified in various ways without departing from the invention herein disclosed, the scope of which is more particularly indicated and defined by the hereto appended claims.

It will also be understood that my invention can be applied in the same or similar manner to an apparatus, other than a swing grinding apparatus, wherein the wearing away, or the reduction in the diameter or a change in the contour or size of an operative element is to periodically effect a compensating or corresponding change in the functioning of such apparatus, automatically in the manner and for a purpose as exemplified by the disclosure hereof.

Furthermore, if desired, certain items may be added to the apparatus, which items are of the type more or less commonly utilized to effect known results in this art. For example, clear plastic sheet material shields, as indicated by the dot-and-dash lines 95ª and 96ª in FIG. 3, can be fixedly applied over the slots or openings 95 and 96 of hood 91, to thereby protect, or otherwise shield the light unit 132 and/or the phototube unit 135 against the effects of flying sparks from the grinding wheel.

I claim:

1. An apparatus of the character described comprising, a rotatably mounted grinding wheel, means for rotating said grinding wheel at a velocity establishing a predetermined peripheral grinding speed, means for periodically increasing the velocity of the grinding wheel in compensating relation with certain incremental diameter reductions thereof resulting from work performing wear, and a photoelectric system that is responsive to said certain incremental diameter reductions of the grinding wheel for actuating said velocity increasing means whereby the said predetermined peripheral grinding speed is substantially maintained during the entire working life of the grinding wheel.

2. An apparatus in accordance with claim 1, wherein the photoelectric system includes a pair of amperite tubes for controlling the starting time of the system.

3. An apparatus in accordance with claim 1, wherein the photoelectric system includes a phototube arranged to be activated by a beam of light passing through a mask having an adjustable slit aperture disposed between the grinding wheel and the phototube.

4. An apparatus in accordance with claim 1, wherein the means for periodically increasing the velocity of the grinding wheel includes a variable speed drive operable by a constant speed motor.

5. An apparatus in accordance with claim 1, wherein the means for periodically increasing the velocity of the grinding wheel includes a variable speed drive operable by a constant speed motor supported by a carriage movable when certain incremental diameter reductions of the grinding wheel are attained to shift the position of said motor and thereby effect a change in the variable speed drive.

6. An apparatus in accordance with claim 1, wherein the means for periodically increasing the velocity of the grinding wheel includes a variable speed drive operable by a constant speed motor on a carriage movable by mechanism operated by a transmission motor device which is operative when certain incremental diameter reductions of the grinding wheel occur to shift the position of the carriage and thereby effect a change in the operating characteristics of the variable speed drive.

7. An apparatus in accordance with claim 1, wherein the means for periodically increasing the velocity of the grinding wheel includes a variable speed drive operable by a constant speed motor on a carriage movable by mechanism operated by a transmission motor device which is activated by the photoelectric system when certain incremental diameter reductions of the grinding wheel occur to shift the position of the carriage and thereby effect a change in the operating characteristics of the variable speed drive.

8. An apparatus in accordance with claim 1, wherein the photoelectric system includes a phototube mounted in a holder positioned adjacent to the grinding wheel and arranged to energize a photoelectric relay when certain incremental diameter reductions of the grinding wheel are attained.

9. An apparatus in accordance with claim 1, wherein the photoelectric system is connected to a source of electric current through a time delay circuit whereby the light source for the phototube of the photoelectric system is energized at the same time that power is applied to the drive motor when the circuit is initially closed.

10. In an apparatus of the character described, having in combination with a grinding wheel, means for rotating said grinding wheel, and speed change means for varying the rotary speed of said grinding wheel in accordance with the change in diameter of the grinding wheel resulting from wear in the use thereof so as to maintain a substantially predetermined peripheral speed of the grinding wheel; of a photoelectric system sensitive to incremental changes in the diameter of the grinding wheel and periodically operative when such incremental changes occur to effect operation of said speed change means to thereby substantially maintain the predetermined peripheral speed of the grinding wheel.

11. An apparatus of the character described comprising, a rotatably mounted grinding wheel, means for rotating said grinding wheel at a velocity establishing a predetermined peripheral grinding speed, means for periodically increasing the velocity of the grinding wheel in compensating relation with certain incremental diameter reductions thereof resulting from work performing wear, and a photoelectric means that is responsive to said certain incremental diameter reductions of the grinding wheel for actuating said velocity increasing means whereby the said predetermined peripheral grinding speed is substantially maintained during the entire working life of the grinding wheel.

12. An apparatus of the character described comprising, a main frame, a grinding wheel mounted on said frame for rotation at a velocity establishing a predetermined substantially constant grinding speed as its diameter decreases due to work performing wear, a jack shaft, means for operating the grinding wheel from the jack shaft at a substantially fixed ratio, a drive motor, a carriage slidably mounted on the frame for supporting the drive motor in a number of positions relative to said jack shaft as the diameter of the grinding wheel decreases, automatic means responsive to the diameter change of the grinding wheel for periodically effecting movement of said carriage from one of said positions to another, means for driving the jack shaft from said motor, and means responsive to a change in the position of the motor carriage relative to said jack shaft for varying the ratio of the drive connection from said motor to said jack shaft to maintain a substantially constant grinding speed of the grinding wheel as it wears away.

References Cited in the file of this patent

UNITED STATES PATENTS

| | | |
|---|---|---|
| 1,052,844 | Philippi | Feb. 11, 1913 |
| 2,003,495 | Ritz | June 4, 1935 |
| 2,042,257 | Harrison et al. | May 26, 1936 |